United States Patent
Guering et al.

(10) Patent No.: US 8,191,823 B2
(45) Date of Patent: Jun. 5, 2012

(54) MAST HAVING MODIFIABLE GEOMETRY FOR SECURING AN ENGINE TO AN AIRCRAFT WING

(75) Inventors: Bernard Guering, Montrabe (FR); Lionel Diochon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 286 days.

(21) Appl. No.: 12/601,650

(22) PCT Filed: May 15, 2008

(86) PCT No.: PCT/FR2008/050841
§ 371 (c)(1), (2), (4) Date: Apr. 21, 2010

(87) PCT Pub. No.: WO2008/155497
PCT Pub. Date: Dec. 24, 2008

(65) Prior Publication Data
US 2011/0192933 A1 Aug. 11, 2011

(30) Foreign Application Priority Data
Jun. 12, 2007 (FR) ...................................... 07 55683

(51) Int. Cl.
*B64D 27/00* (2006.01)
(52) U.S. Cl. .......................................... 244/54; 60/797
(58) Field of Classification Search .................... 244/54, 244/56; 60/796, 797; 248/554, 555, 556, 248/557
See application file for complete search history.

(56) References Cited

U.S. PATENT DOCUMENTS

| | | | | |
|---|---|---|---|---|
| 2,257,940 A * | 10/1941 | Dornier | ...................... | 244/53 R |
| 3,085,773 A * | 4/1963 | Covey et al. | .................. | 248/555 |
| 3,327,965 A * | 6/1967 | Bockrath | ........................ | 244/54 |
| 3,451,648 A * | 6/1969 | Haberkorn et al. | ............. | 244/56 |
| 3,633,847 A * | 1/1972 | Fricke et al. | ................. | 244/12.4 |
| 2009/0084893 A1* | 4/2009 | Balk | ................................ | 244/54 |
| 2011/0127371 A1* | 6/2011 | Takeuchi | ........................ | 244/54 |
| 2011/0259996 A1* | 10/2011 | Vetters et al. | ................... | 244/54 |

FOREIGN PATENT DOCUMENTS

| | | |
|---|---|---|
| DE | 1109038 B | 6/1961 |
| FR | 1108012 A | 1/1956 |
| FR | 2 869 589 A | 11/2005 |
| GB | 2 303 864 A | 3/1997 |

OTHER PUBLICATIONS

International Search Report and Written Opinion dated Nov. 24, 2008.

* cited by examiner

*Primary Examiner* — Timothy D Collins
*Assistant Examiner* — Michael A Fabula
(74) *Attorney, Agent, or Firm* — Perman & Green, LLP

(57) ABSTRACT

A securing mast for securing an engine to the wing of an aircraft, wherein the device includes two fasteners, a first end of each fastener being secured to the engine and the second end of each fastener being secured to the wing, wherein the fasteners include hinged junction means capable of modifying the geometry of the aforementioned fasteners in order to modify a distance between the engine and the wing.

6 Claims, 3 Drawing Sheets

MAST HAVING MODIFIABLE GEOMETRY FOR SECURING AN ENGINE TO AN AIRCRAFT WING

CROSS-REFERENCE TO RELATED APPLICATIONS

This application is the National Stage of International Application No. PCT/FR2008/050841 International Filing Date, 15 May 2008, which designated the United States of America, and which International Application was published under PCT Article 21 (s) as WO Publication No. WO2008/155497 A1 and which claims priority from, and the benefit of, French Application No. 200755683 filed on 12 Jun. 2007, the disclosures of which are incorporated herein by reference in their entireties.

BACKGROUND

The aspects of the disclosed embodiments relate to the field of aeronautics. More precisely, the disclosed embodiments relate to a securing mast equipped with two fasteners capable of connecting an engine to the wing of an aircraft at two distinct points, in other words at two different places on the engine and on the wing. The securing mast according to the disclosed embodiments is very particularly suitable for electric motors whose power supply systems for the on-board systems are electrical systems.

Aircraft engines at the present time are connected to the wing of said aircraft by a rigid joint. By a rigid joint is meant a fixed mast relative to the engine and to the wing. Such a rigid securing mast requires reinforcement of the aircraft that contributes to a substantial increase in the total weight of said aircraft. Actually, during stresses from squalls, for example, the engine imposes vertical loads on the mast. To support such loads, the present securing mast is a heavy mast.

In other respects, "spinning" of the engine's compressor in operation induces and propagates vibrations in the aircraft whose frequency is between 4 and 15 Hertz (Hz). "Spinning" operation, designated in general by the Anglo-Saxon term "windmilling," occurs when the aircraft engine is stopped in flight after the breakage of one or more blades of its compressor. The compressor then rotates freely, or autorotates, under the action of a stream of air entering said engine. These induced vibrations subject the structure of the aircraft and accordingly the crew and passengers to substantial vibrational forces and among other things make it difficult for the pilot subjected to them to do his job. To resist these vibrational forces, it is known how to reinforce the structure of the aircraft and of the furnishings, supports, calculators, seats, and all of the components introduced into said aircraft, which tends to increase greatly the total weight of the aircraft. These reinforcements may increase the total weight of the aircraft by several tons.

SUMMARY

The disclosed embodiments attempt to provide a mast for securing an engine to one of the wings of an aircraft of such a nature that it is no longer necessary to increase the weight of said aircraft in an exaggerated manner.

To do this, the disclosed embodiments propose a fastener device that has two movable segments in a V-shaped arrangement. More precisely, the two segments are arranged side by side and are inclined relative to one other so that the fastener device has a V-shaped transverse cross section. By movable is meant that the connection between the aircraft and the engine made by the two segments is no longer fixed but can be modified, especially in height. Height means the dimension of the fastener device extending between the engine and the wing to which said engine is to be connected. The mobility of the fastener device according to the disclosed embodiments can be obtained by active jacks that can augment or diminish the distance between the engine and the wing as needed. For example, when the engine imposes a vertical stress on the mast, it is possible to raise said mast toward the wing to prevent or at least to reduce the stress imposed on said mast. In the same way, when the engine is in free rotation, or "windmilling," the position of the engine relative to the wing can be modified so that said mast resists the imbalance. Imbalance means the lack of balance of the engine due to the fact that the center of gravity of said engine is not located on the axis of rotation of said engine. The mast resists the imbalance by putting itself in phase opposition relative to the vibrations induced by the autorotation of the engine. Thus it is no longer necessary to reinforce the structure of the aircraft in a general and substantial manner to resist these vibrations.

The mobility of the mast according to the disclosed embodiments can be used advantageously in other respects to increase the performance of an aircraft, by providing said aircraft with an engine that has a compressor of greater diameter. Actually, the size of the engines is limited at the present time in the case of aircraft equipped with a low-mounted wing, on the one hand by keeping an eye on the ground, in other words watching the distance between the engine and the ground, which has to be great enough not to endanger the engine, and on the other hand by the distance between the engine and the wing, which also has to be great enough to avoid risks of interactions between the engine and the wing in flight. With a movable mast according to the disclosed embodiments, it is possible to reduce the distance between the engine and the wing when the aircraft is on the ground, so as to increase the clearance from the ground, and to increase the distance between the engine and the wing once the aircraft is in flight.

It is also possible to use the movable mast according to the disclosed embodiments to contribute to the maneuverability and the takeoff of the aircraft by increasing the thrust of the engine as needed. For example, during takeoff it is possible to orient the output jet of the engine downward by orienting the nose of the engine toward the aircraft fuselage, and later to restore the engine to a horizontal position. In the same way it is possible to modify the position of the engine relative to the wing to orient the jet from the engine right and left laterally, to contribute to the lateral control of the flight path of the aircraft. It is thus possible to reduce the size of the aircraft's rudder, which normally provides lateral control, and thus to reduce the total weight of said aircraft.

Accordingly, the subject matter of the disclosed embodiments is a securing mast intended to connect an engine to an aircraft wing, with this device having two adjacent fasteners, with a first end of each of the fasteners being integral with the engine, and with a second end of each of the fasteners being integral with the wing, characterized in that the fasteners have hinged connectors suitable for modifying a geometry of said fasteners so as to modify a distance between the engine and the wing.

Hinged connectors mean connectors not fastened rigidly to the wing and to the engine, so as to permit an angular motion of the engine relative to the wing. Geometry of the fasteners means the shape, i.e. the external contour of the fasteners, their position relative to the wing, and the X, Y, Z orientation of said fasteners. Adjacent fasteners mean that they are arranged side by side so as to extend in the same transverse plane of the engine.

According to the examples of embodiment of the securing mast of the disclosed embodiments, it is possible to provide for all or some of the following supplementary characteristics:

- The hinged connectors in the same fastener have two jacks, front and rear respectively, arranged in parallel with one another in a dimension of the fastener intended to extend between the engine and the wing. Such jacks provide for increasing or reducing the distance between the engine and the wing as needed.
- The front jack is intended to be fastened at a first end to the engine and at the second end to the front spar of the wing, and the rear jack is intended to be fastened by a first end to the engine and by a second end to the rear spar of the wing. The two jacks thus form two opposite sides of a parallelogram whose other two sides are formed by the engine and the wing.
- The hinged connectors in the same fastener have a horizontal strut connecting the ends of the two jacks fastened to the engine, thus forming a third side of the parallelogram.
- The hinged connectors in the same fastener have a vertical strut connecting the end of the front jack fastened to the front spar of the wing to the end of the rear jack fastened to the engine, so as to extend in a diagonal of the parallelogram.
- The two fasteners extend in two distinct longitudinal planes inclined relative to one another, so that a distance between the first ends of the two fasteners is smaller than a distance between the second ends of said fasteners. Thus, the securing mast is V-shaped in transverse cross section.
- Modification of the geometry of the fasteners is controlled by an external control system, for example depending on data from various sensors.

BRIEF DESCRIPTION OF THE DRAWINGS

The disclosed embodiments will be better understood by reading the following description and examining the figures that accompany it. These are presented by way of example and do not limit the disclosed embodiments in any way. The figures show.

DETAILED DESCRIPTION

Figure 1:
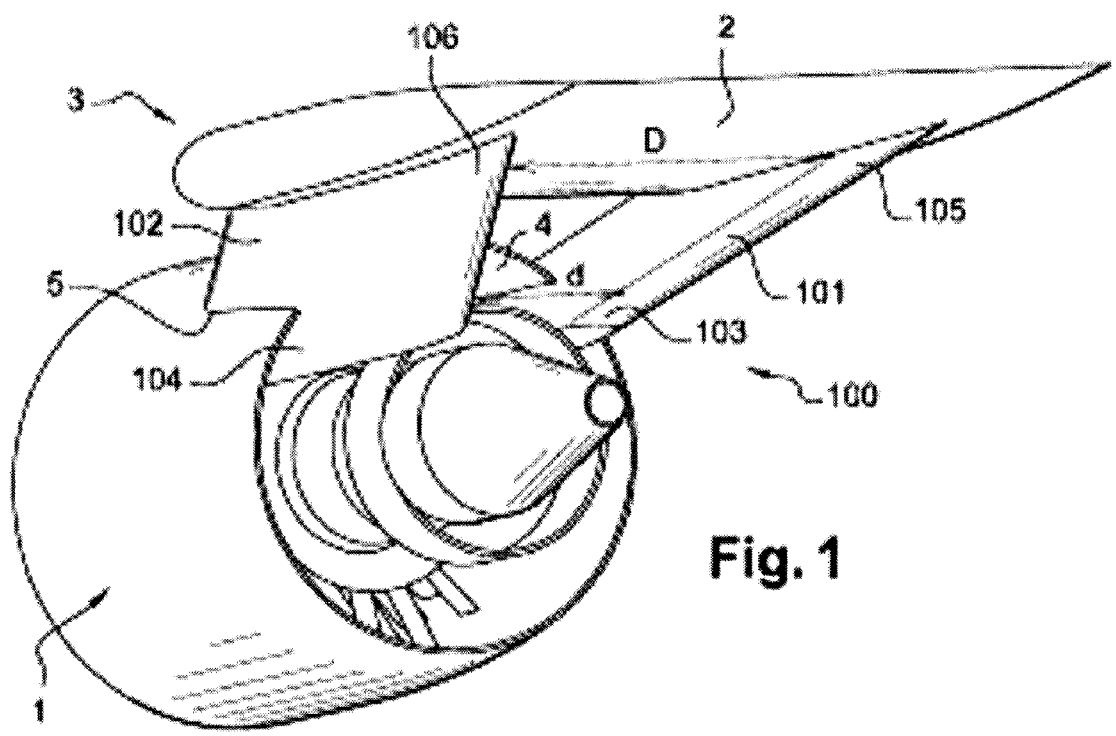
FIG. 1: a schematic view from the rear of an engine fastened to an aircraft wing by a securing mast that may be from the disclosed embodiments.

FIG. 1 shows an engine 1 fastened to the bottom face 2 of an aircraft wing 3 by a securing mast 100 that has two distinct fasteners 101, 102, or segments. These fasteners 101, 102 provide for fastening the engine 1 to the wing 3 at two different places, specifically so as to better distribute the weight of said engine 1 on the wing 3. More precisely, a first fastener 101 is fastened at a first end 103, the bottom end in this case, to an upper right lateral surface 4 of the engine 1, while a first end 104 of the second fastener 102, also the bottom end, is fastened to an upper left lateral surface 5 of said engine 1. In the same way, a second end, the top end 105, 106 in this case, of each of the fasteners 101, 102 of the securing mast 100 is fastened to the bottom face 2 of the wing at two distinct places.

In the example shown in FIG. 1 and in the following FIGS. 2, 3, and 4, the fasteners 101, 102 are arranged relative to the engine 1 and to the wing 3 so that they have a V-shaped transverse cross section. In other words, the distance d between the bottom ends 103, 104 is stringently less than the distance D between the top ends 105, 106 of the fasteners 101, 102. Such a V-shaped arrangement of the fasteners of the securing mast according to the disclosed embodiments distributes the weight of the engine over a broader surface of the wing.

In all of the examples described here, the engine 1 is located beneath the lower surface 2 of the wing 3 of an aircraft. However, a wing of an aircraft can also mean a horizontal elevator of said aircraft. In this case, the engine 1 can just as well be suspended beneath the elevator as being held above said elevator. In this case, the first ends of the fasteners 101, 102 attaching the securing mast to the engine are the top ends, while the second ends 105, 106 attaching the securing mast to the wing, in this case the elevator, are the bottom ends.

Figure 2:
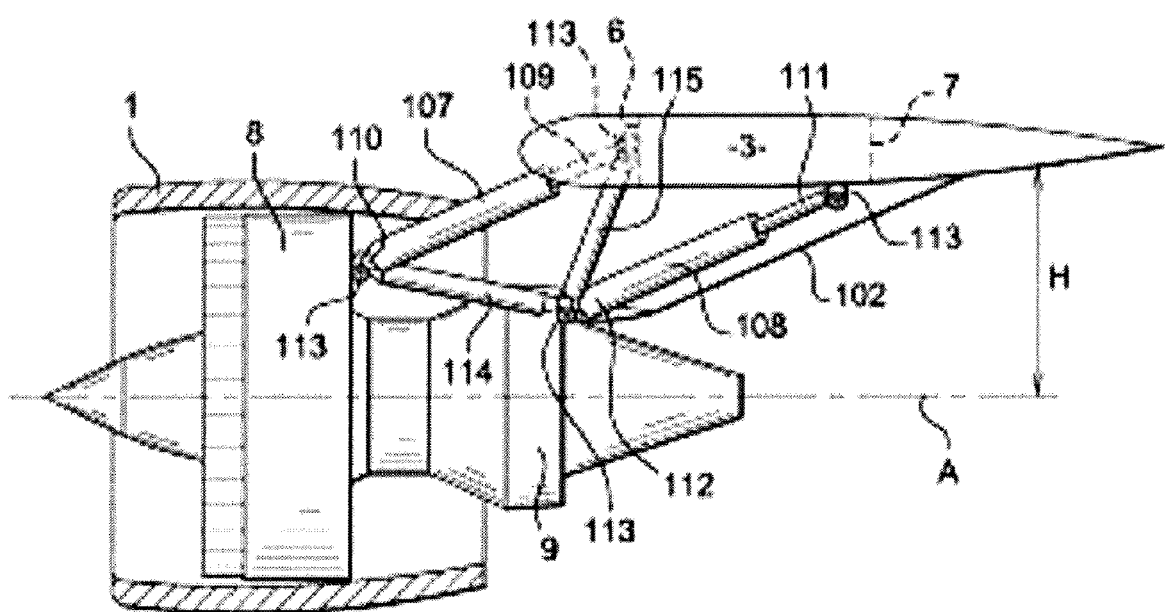
FIG. 2: a schematic side view of an engine fastened to an aircraft wing by a securing mast according to the disclosed embodiments.
Figure 3:
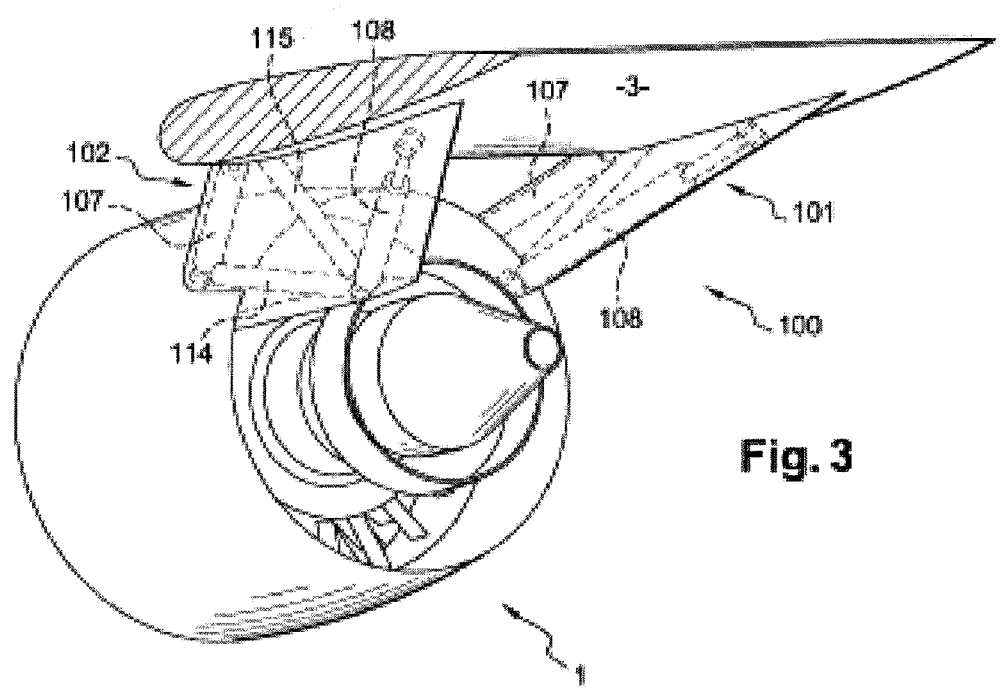
FIG. 3: the mast/engine/wing assembly of FIG. 2 viewed from the rear.
Figure 4:
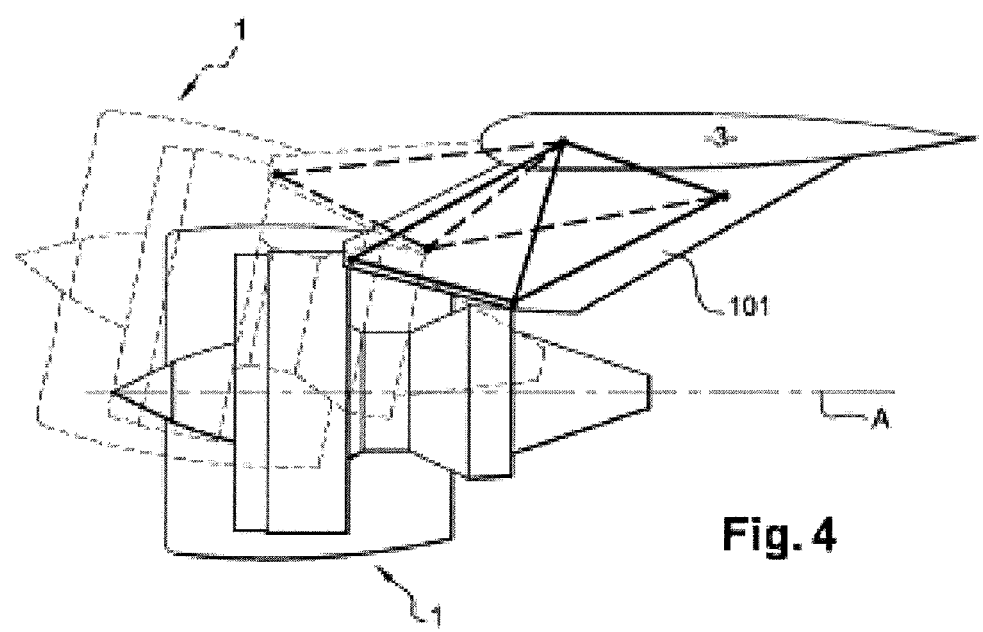
FIG. 4: a schematic side view of the mast/engine/wing assembly according to the disclosed embodiments when the engine is in a low position and in a high position.

FIGS. 2, 3, and 4 show an example of embodiment of the movable mast according to the disclosed embodiments.

To be movable, each of the segments 101, 102 of the securing mast 100 is equipped with two jacks 107, 108, each fastened to the engine 1 and to the wing 3, and arranged one behind the other relative to the longitudinal axis A of the engine 1.

The front jack 107 is fastened at a top end 109 to the front spar 6 of the wing 3 and at a bottom end 110 to the compressor 8 of the engine 1. The rear jack 108 is fastened at a top end 111 to the rear spar 7 of the wing 3 and at a bottom end 112 to the exhaust nozzle 9 of the engine 1. The ends 109, 110, 111, 112 of the jacks 107, 108 are fastened to the engine 1 and the wing 3 by hinges 113. Thus the connection between the engine 1 and the wing 3 can be modified in height H by lengthening or shortening the jacks 107,108 and by rotation of said jacks 107, 108 at the hinged connecting points 113 between said jacks 107,108 and the engine 1 and the wing 3, respectively. The height H means the dimension between the longitudinal axis A of the engine 1 and the wing 3. Front or rear means relative to the direction of flow of the air entering the engine 1 under normal conditions of use of said engine 1.

Each fastener 101, 102 of the securing device 100 also has a horizontal strut 114 extending between the bottom ends 110, 112 of the front and rear jacks 107 and 108, respectively. The horizontal strut 114 is mounted to rotate on each of the ends 110, 112 of the jacks 107, 108 by a hinged joint 113.

Each fastener 101, 102 also has a vertical strut 115. Considering that the jacks 107, 108 and the horizontal strut 114 form three sides of a parallelogram whose fourth side consists of the surface of the bottom face of the wing 3 extending between the two top ends 109, 111 of the jacks 107, 108, the vertical strut 115 extends in a diagonal of said parallelogram. The jack 115 is fastened by a hinge 113 to the top end 109 of the front jack 107 and by a hinge 113 to the bottom end 112 of the rear jack 108. The parallelogram formed by the jacks 107, 108 and the struts 114, 115 is a deformable parallelogram that can have a geometry varying from a square to a very flattened lozenge.

As visible in FIG. 4, the geometry of the fasteners 101, 102 according to the disclosed embodiments is modifiable by lengthening or shortening the length of the jacks 107, 108.

By reducing the length of the front jacks 107 and/or increasing the length of the rear jacks 108 simultaneously in the two fasteners 101, 102, the height H between the engine 1 and the wing 3 is reduced, while pushing said engine 1 forward (dashed lines in FIG. 4). To move the engine 1 to the left, the length of the front jack 107 of the left fastener 102 can be increased while the length of the front jack 107 of the right fastener 101 is increased, or the length of the rear jack 108 of the left fastener 102 can be increased while the length of the rear jack of the right fastener 101 is reduced. The reverse procedure can be followed to make the engine 1 veer to the right. In this way, the distribution of the weight of the engine over the wing can be modified by conveying a greater share of the weight of said engine 1 to a right or left lateral section of said engine. This enables compensation in particular for the imbalance during "windmilling."

Of course it is possible to modify the geometry of one fastener 101, 102 independently of the geometry of the second fastener.

In some cases, for example to compensate for imbalance, the modification of the geometry of the fasteners 101, 102 may advantageously be automatic, in other words without the intervention of a person present in the aircraft, for example depending on data transmitted by various sensors. In case the geometry of the fasteners 101, 102 is to be modified to provide for easier takeoff, or to provide for greater clearance from the ground, this modification may advantageously be controlled from the aircraft's cockpit.

Figure 5:
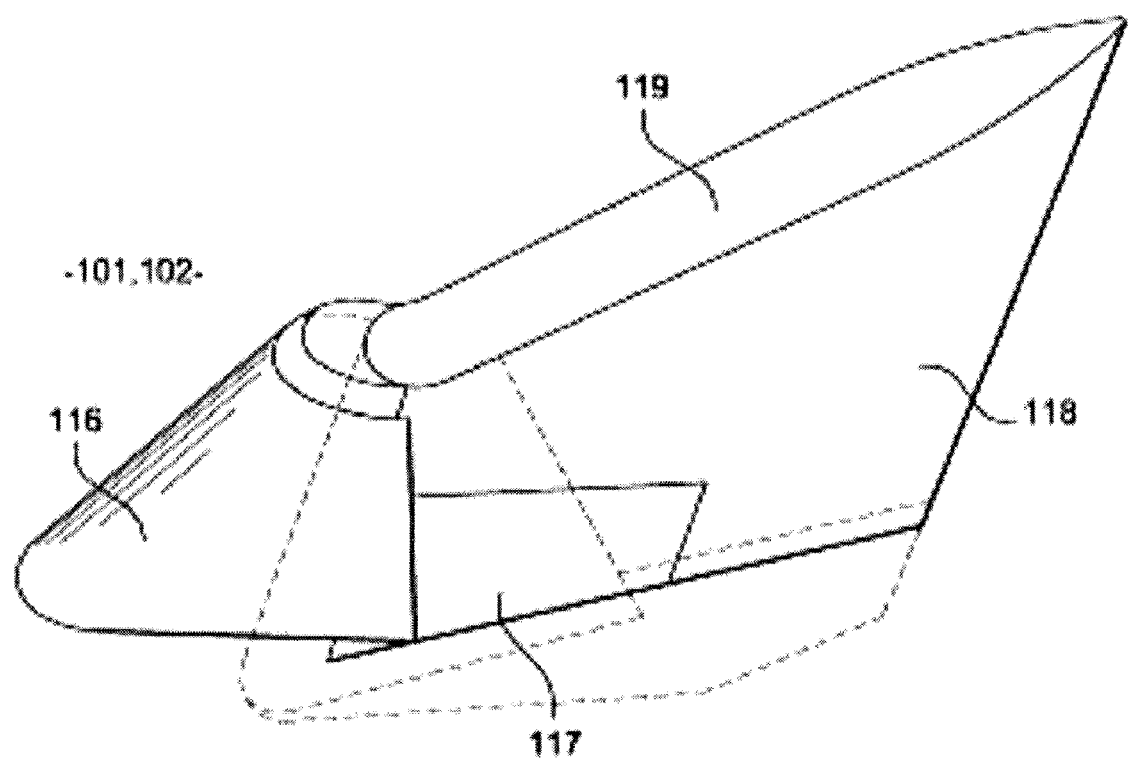
FIG. 5: a schematic representation of two different geometries that a fastener of the securing mast according to the disclosed embodiments may have.

In a particular example of embodiment of the disclosed embodiments, and as shown in FIG. 5, the cover of the segments 101, 102 of the securing device 100 according to the disclosed embodiments is formed of independent panels 116, 117, 118, 119, for example made of sheet metal or of composite material, that can slide on one another with an overlapping area between the panels to avoid aerodynamic drag. A first panel 116 has a border fastened at two points to the fixed sections of the front jack, a second panel 117 has a border fastened at two points to a left side of the horizontal strut, a third panel 118 has a border fastened at two points to a left side of the fixed section of the rear jack, a fourth panel 119 has a border fastened at two points to the wing, a fifth panel (not visible) has a border fastened at two points to a right side of the horizontal strut, and a sixth panel (not visible) has a border fastened at two points to a right side of the fixed section of the rear jack. The panels induce a deformation of the parallelogram by sliding and overlapping one another. This, in FIG. 5, an arrangement of the panels 116, 117, 118, 119 can be seen when the fastener 101, 102 holds the engine in a high position and when the fastener 101, 102 holds the engine in a low position (dashed line in FIG. 5).

The invention claimed is:

1. A securing mast connecting an engine to an aircraft wing, wherein the securing mast has fasteners, with a first end integral with the engine, and a second end integral with the wing, with the fasteners having hinged connectors which modify a geometry of said fasteners so as to modify a distance between the engine and the wing, wherein the hinged connectors in the same fastener have two jacks, front and rear respectively, arranged parallel to one another in a dimension of the fastener extending between the engine and the wing.

2. The securing mast according to claim 1, wherein the front jack is fastened at a first end to the engine, and at a second end to the front spar of the wing, and in that the rear jack is fastened at a first end to the engine, and at a second end to the rear spar of the wing.

3. The securing mast according to claim 1, wherein the hinged connectors in the same fastener have a horizontal strut that connects the ends of the two jacks fastened to the engine.

4. The securing mast according to claim 1, wherein the connectors in the same fastener have a vertical strut that connects the end of the front jack fastened to the front spar of the wing to the end of the rear jack fastened to the engine.

5. The securing mast according to claim 1, wherein the fasteners extend in two distinct planes inclined relative to one another, so that the securing mast has a V-shaped cross section.

6. The securing mast according to claim 1, wherein a modification of the geometry of the fasteners is controlled by an external control system.

* * * * *